INVENTOR.
Orville J. Borrowdale

May 21, 1957     O. J. BORROWDALE     2,792,926
ELEVATOR-CONVEYOR MECHANISM HAVING CAM
OPERATED LATERALLY MOVABLE BLADES
Filed May 11, 1953     5 Sheets-Sheet 3

INVENTOR.
Orville J. Borrowdale
BY
Gary Desmond & Parker
Att'ys.

May 21, 1957
O. J. BORROWDALE
2,792,926
ELEVATOR-CONVEYOR MECHANISM HAVING CAM
OPERATED LATERALLY MOVABLE BLADES
Filed May 11, 1953
5 Sheets-Sheet 4
Fig. 5
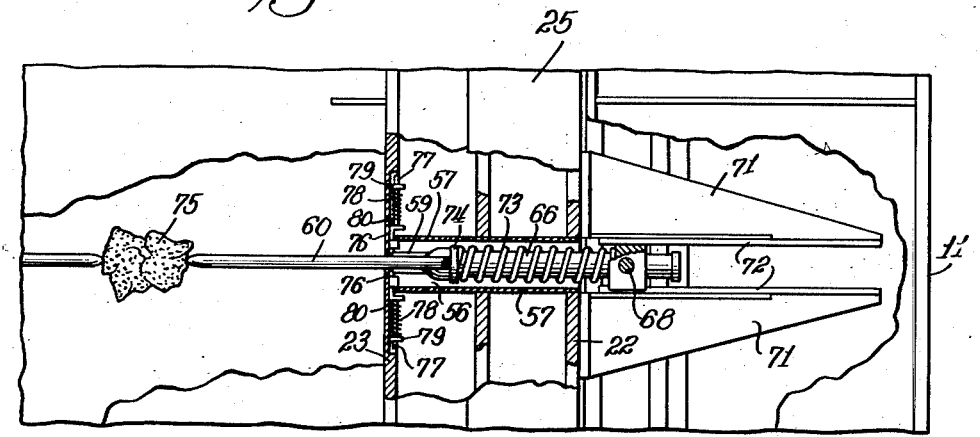
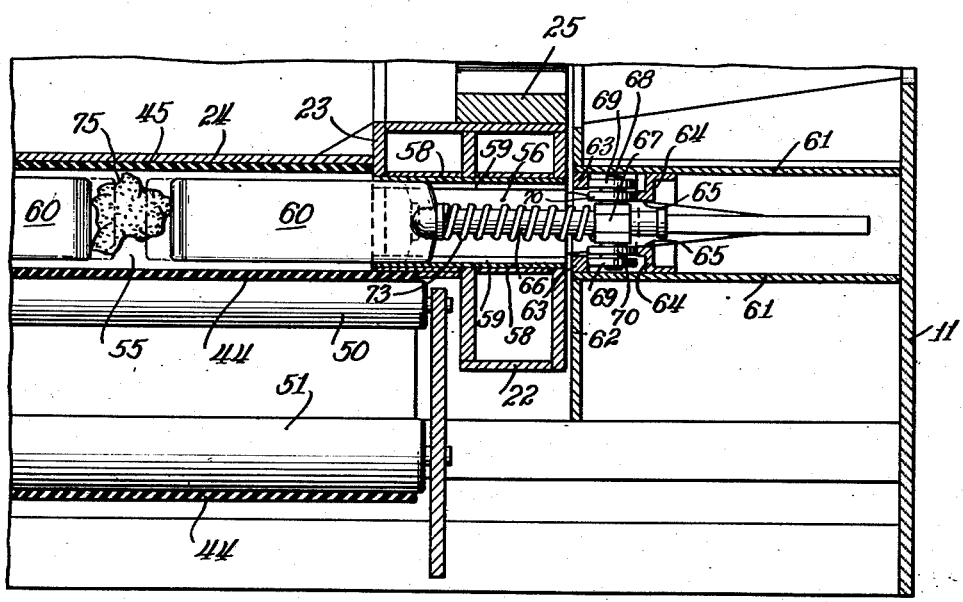
Fig. 4
INVENTOR.
Orville J. Borrowdale
BY
Gary Desmond & Parker
Att'ys.

May 21, 1957 — O. J. BORROWDALE — 2,792,926
ELEVATOR-CONVEYOR MECHANISM HAVING CAM
OPERATED LATERALLY MOVABLE BLADES
Filed May 11, 1953 — 5 Sheets-Sheet 5

INVENTOR.
Orville J. Borrowdale
BY
Gary Desmond & Parker
Attys

United States Patent Office

2,792,926
Patented May 21, 1957

2,792,926

ELEVATOR-CONVEYOR MECHANISM HAVING CAM OPERATED LATERALLY MOVABLE BLADES

Orville J. Borrowdale, Chicago, Ill.

Application May 11, 1953, Serial No. 353,937

11 Claims. (Cl. 198—167)

This invention relates to improvements in an elevator-conveyor, that, is a mechanism for lifting or elevating material from a lower level to an upper level as a step in the conveying of such materials.

The present invention comprises a device which may, in effect, comprise a link in a conveyor system, wherein the material carried by the conveyor system is continuously raised from a lower level to an upper level, the device being characterized in that the effective lift of the material is relatively great compared to the distance traveled by the material.

Hoists or inclined conveyors have heretofore been proposed for raising material from a lower level to an upper level, but in substantially all cases where the material is lifted abruptly, as by means of usual bucket hoists, the operation is slow and the equipment is expensive, and where inclined conveyors are employed, the rate of lift relative to the linear travel of the conveyor belt is relatively low negativing the use of such conveyors where the situs of the material being lifted provides only limited space.

As a feature of the present invention a device is contemplated for raising material wherein the rate of rise per unit volume of material carried is high, that is, the capacity is relatively great and wherein the space or distance through which the material is carried is small whereby the device is ideally adaptable to handle materials which are confined in more or less cramped spaces. In addition, the cost of the device and power expended in operating it is relatively low per unit of volume raised per unit of effective lift.

A further feature of the present invention resides in the provision of blade, baffle or partition means which are movable into and out of the material to be elevated during the period of elevating the same to prevent undue slippage of the material, the blade, baffle or partition means being inserted into the material at the commencement of its lift and being withdrawn from the material after the lifting has been completed.

As an important feature of the present invention means is contemplated for conveying material upwardly at a relatively acute angle, there being means associated with the conveying agency whereby blades or other projecting members are inserted into the body of the material to inhibit rearward or retrogressive movement of the material during its elevation, the actuating means for the insertion of said blades or projecting members comprising cam rails or tracks associated with said blades or projecting members which are of such contour that during the elevation of the material the blades or projecting members are moved laterally into the material, and at the end of the elevating period are retracted from said material.

Other objects, advantages and features of the present invention will be apparent from the accompanying drawings and following detailed description.

In the drawings,

Fig. 4 is an enlarged detailed sectional view taken on line 4—4 of Fig. 3.

Fig. 5 is a detailed plan view, parts being shown in section, of the device shown in Fig. 4.

Figure 1:
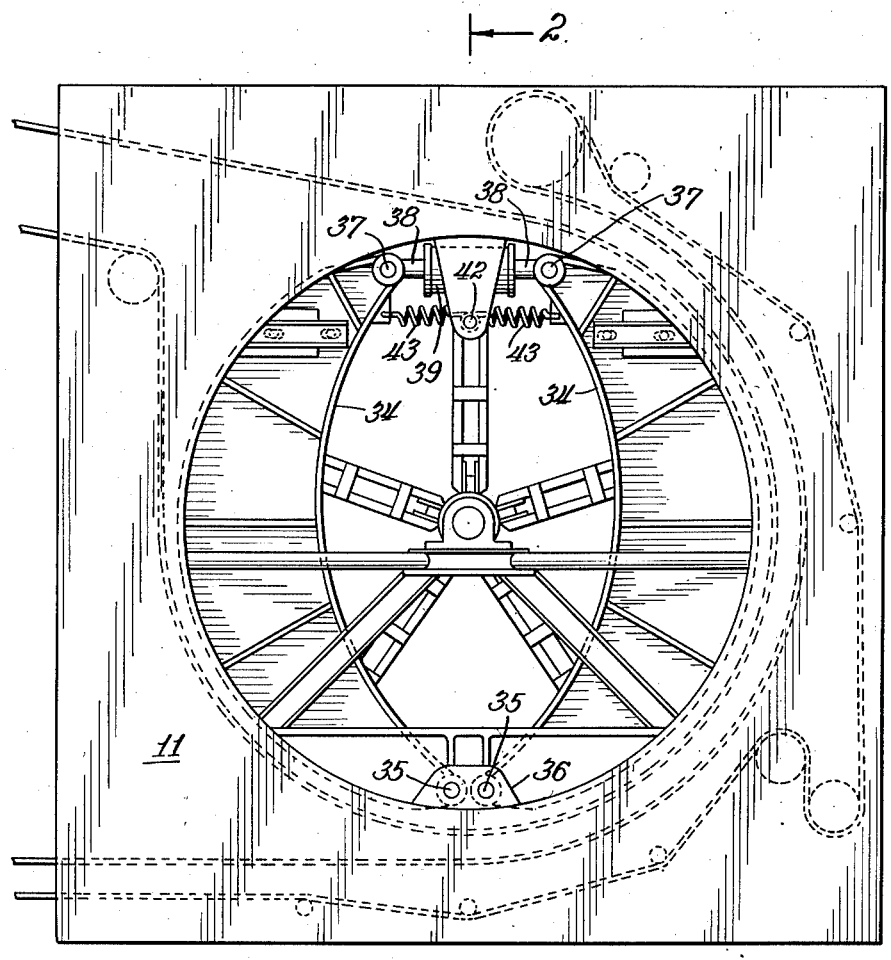
Fig. 1 is a front elevational view of the device comprising the present invention.

The device comprising the present invention includes generally a relatively stationary frame 1 and a relatively rotatable frame 2, the rotatable frame being mounted upon the stationary frame and being rotatable relative thereto. The stationary frame 1 comprises vertical frame members 2, top frame members 3, bottom frame members 4 and transverse frame members 5 which extend from the front portion of the stationary frame to the rear portion thereof. Diagonal braces 6 may be employed along with brace members 7 to rigidify the stationary frame structure.

Horizontal supporting members 8 extend from both the front portion and the rear portion of the stationary frame and diagonal beams 9 are also secured at one end to the stationary frame. The horizontal members 8 and beams 9 function to support I beams 10 which are disposed in spaced relationship at the central portion of the stationary frame.

If desired, face plates 11 may be disposed upon the front and rear faces of the stationary frame whereby the rotatable frame 2 is partially enclosed. A bearing 12 is mounted upon each of the oppositely spaced I beams 10, said bearing being adapted to support a transverse shaft 13 upon which the rotatable frame 2 is mounted. A hub 14 is rotatably mounted upon shaft 13 and on said hub a plurality of circumferentially spaced radially extending spoke members 15 are mounted. The spoke members 15 are preferably constructed of built-up structural members, each spoke member comprising a pair of spaced structural members 16 secured together by longitudinally spaced bridging or brace members 17. The spoke members 15 are joined to hub 14 by means of spreader plates 18.

At the outer ends of each of the spoke members 15 said spoke members are joined to transverse spreader plates 19 and arcuate spreader plates 20. A drum 21 is secured to the transverse and arcuate spreader plates 19 and 20 respectively, said drum being substantially cylindrical in shape and comprising a portion of the outer periphery of the rotating frame 2.

Adjacent the outer periphery of the rotating frame 22 are spaced annular box-sectioned members 22 and secured inwardly of said box-sectioned members 22 are smaller annular box-sectioned members 23, said latter box-sectioned members being joined by a transverse plate 24 which extends around the entire periphery of the rotating frame. A ring gear 25 is mounted upon the inner periphery of one of the annular box-sectioned members 22, said ring gear being in mesh with a pinion 26 which is mounted upon output shaft 27 of a conventional gear reducing mechanism 28. The shaft 27 is journaled in a bearing 28 which is carried upon a portion of the stationary frame 1. An electric motor 29 is mounted upon the stationary frame adjacent the gear reducer 28 and shaft 30 of said motor is operatively connected to shaft 31 of the gear reducer 28 by means of a belt 32. The shaft 31 of the gear reducer 28 is the input shaft to said gear reducer, the arrangement being such that motor 29 drives pinion 26 through the gear reducer 28. Rotation of the pinion 26 results in rotation of the ring gear 25 and hence rotation of the rotatable frame 2 upon shaft 13.

Mounted upon the inner periphery of the opposite annular box-sectioned member 22 is an annular brake drum 33. A pair of arcuate faced brake shoes 34 are adapted to cooperate with the brake drum 33 to stop or retard rotary motion of the rotatable frame 2 when occasion demands. Each of the brake shoes 34 at their lower end are pivoted as at 35 in Fig. 1, said pivots being mounted upon bracket 36 comprising a portion of the stationary frame. The opposite ends of the brake shoes 34 are pivotally secured as at 37 in Fig. 1 to opposite ends of a piston rod 38 which is reciprocally mounted in a hydraulic cylinder 39. Within the cylinder 39 a pair of pistons 40 (only one of which is shown) are disposed, the arrangement being such that when a hydraulic fluid is introduced into the cylinder 39 the piston rods 38 are moved outwardly in opposition to each other and the free ends of the brake shoe 34, that is the ends carrying pivot pins 37 are moved outwardly whereby the arcuate surfaces of the brake shoes 34 are brought into braking contact with the brake drum 33. A bracket member 41 is carried upon the stationary frame and supports a rod 42. Coil springs 43 are anchored to rod 42 and extend in opposite directions relative thereto, the opposite ends of the coil springs being secured to the opposite brake shoes 34 whereby said shoes are retracted from braking position when the fluid pressure within cylinder 39 is relieved.

Figure 3:
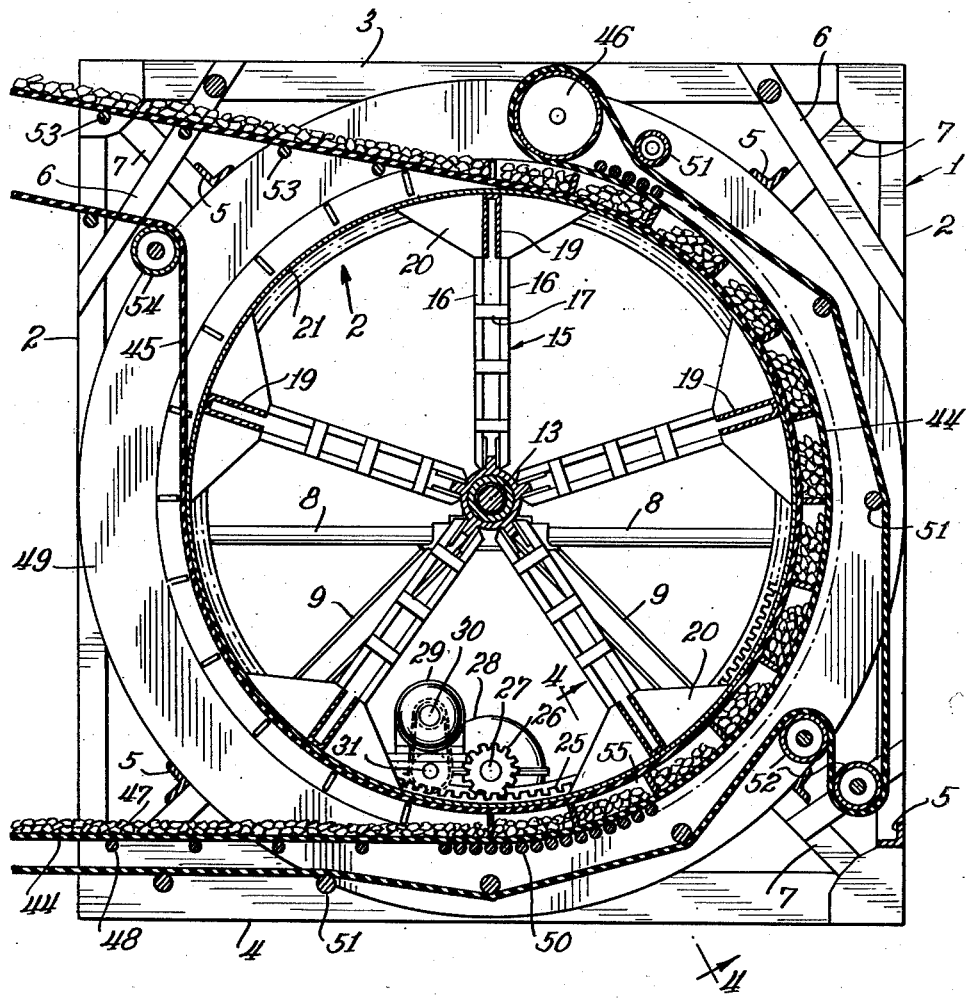
Fig. 3 is a sectional view taken on line 3—3 of Fig. 2.

As illustrated partially diagrammatically in Fig. 3, a pair of conveyor belts 44 and 45 are employed with the device comprising the present invention. The belt 44 comprises an endless flexible conveyor belt which is trained around a terminal roll 46 rotatably mounted upon the stationary frame 1. The belt 44 is the feed belt for the device, that is, material 47 to be conveyed and elevated is carried to said device on the upper pass of said belt. The feed belt is also trained around a terminal roll (not shown) which may be disposed remote from the device whereby the belt may pass the situs of the mass of material to be elevated and whereby said belt may be loaded. The upper pass of the feed belt 44 may be suitably supported by rolls 48 which may, in turn, be carried by the stationary frame.

Figure 2:
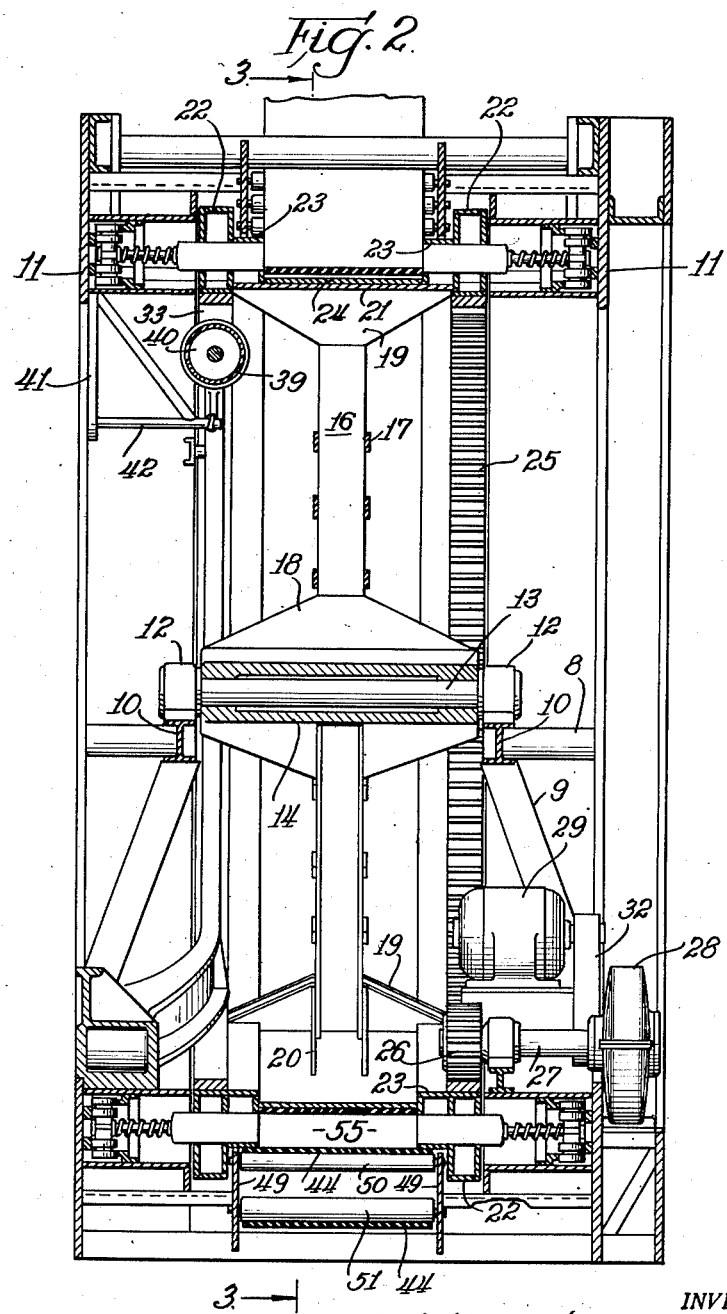
Fig. 2 is a vertical sectional view taken on line 2—2 of Fig. 1.

A pair of spaced annular plates 49 may be mounted upon stationary frame 1 and may be disposed radially outwardly from the outer periphery of the annular box-sectioned member 23. A plurality of guide rolls 50 may be rotatably supported by the plates 49, said rolls being disposed relatively close together and defining an arcuate path which is coaxial with and radially spaced from the drum plate 21 at substantially the entire upward passage of the rotatable frame 2. The upper pass of the feed belt from its lowermost position relative to the rotatable frame 2 passes around a portion of said rotatable frame, the opposite edge portions being in wrapping contact with the outer surface of the box-sectioned member 23, as shown best in Figs. 2 and 4. Thus, the feed belt is driven by the rotatable frame 2. In view of the fact that the upper pass of the feed belt 44 carries material 47 during its upward travel with frame 2 it rides upon the surfaces of the rolls 50 and is supported thereby. However, the edge portions of the feed belt are relatively tightly confined between the rolls 50 and the outer face of the box-sectioned members 23 and, hence, slippage will not occur.

Adjacent the uppermost position of the rotatable frame 2, the belt 44 returns over the terminal roll 46 and is guided during its return pass by guide rolls 51, the belt also passing around belt-tightener rolls 52, the guide rolls 51 and belt-tightener rolls being carried by the stationary frame 1.

Belt 45 may comprise the discharge belt and may also be wrapped around and be driven by the rotatable frame 2. The belt 45 is narrower than belt 44 and makes wrapping contact with the outer face of the cylindrical plate 24. The upper pass of the belt 45 is supported by rolls 53 and the return pass is guided by rolls 54 both of which are rotatably mounted upon the stationary frame 1. Belt 45 passes around a terminal roll (not shown) remote from the device whereby the material 47 may be conveyed to a desired situs.

It can readily be seen that the feed pass of belt 44 and the discharge pass of belt 45 traverse a common angular portion of the rotatable frame 2, that is, the upwardly moving side of said frame. It can also be seen that the belts are radially spaced from each other during said common travel whereby an arcuate space 55 is provided between said belts. It is through said space that the material 47 travels.

It can readily be seen that as the upper pass of the belt 44 moves onto rolls 50 the upward climb of said belt around the rotatable frame becomes rapidly acute and, hence, when the angle of repose or slip is reached the material 47 would tend to slide rearwardly or to retrogress. It is a feature of the present invention to inhibit or prevent this retrogressive movement and said end is obtained by mechanism which will be hereinafter more fully described.

Circumferentially spaced at each side of the rotatable frame 2 are a plurality of blade compartments 56 which extend through both annular box-sectioned members 22 and 23. The compartments 56 are defined by opposite side walls 57 and top and bottom walls 58. Each of the compartments 56 connect at one end with the arcuate space 45. A pair of guides 59 are carried by the top and bottom wall 58 of each compartment in which a blade or projecting member 60 is guide for reciprocating movement into space 55 and said compartment, that is, the projecting member in its extended position protrudes into space 55 and in its retracted position is positioned within compartment 56.

The compartments at each side of the rotatable frame may be opposite each other, as illustrated, or, if desired, the compartments on opposite sides may be staggered relative to each other.

A spaced pair of annular walls 61 are supported at one end by each plate 11 comprising a portion of the stationary frame. At the opposite ends said plates are supported by an annular wall 62 also comprising a portion of the stationary frame. The arrangement is such that a pair of annular walls 61 are disposed on each side of the stationary frame outwardly from the opposite corresponding sides of the box-sectioned members 22.

A pair of rails 63 and 64 are disposed in corresponding juxtaposition on the inner faces of each of the walls 61 on each side of the device. Rails 63 are disposed adjacent the walls 61 and each of the rails 64 carries an offset flange 65 which is offset inwardly from the walls 61 and also from rails 63. The purpose of the offset relationship of rails 63 and 64 will be more fully described hereinafter. Each of the pairs of rails 63 and 64 are endless and, in general, follow the path of travel of the rotating frame.

Each of the projecting members or blades 60 is carried by a shank 66 which extends outwardly relative to the arcuate space 55, each shank extending freely through a block 67. A stub shaft 68 extends outwardly on opposite sides of the block at right-angles to shank 66 and each oppositely extending stub shaft carries a pair of rollers 69 and 70. The arrangement is such that rollers 69, the outer rollers bear upon rails 63 and the rollers 70, the inner rollers, bear upon the offset rail 65. Thus, when the rollers move through the cam track, comprising rails 63 and 64, all of the same corresponding rollers will bear against a predetermined rail when the thrust upon the roller surfaces by said rail tend to move block in one direction and all of the other corresponding rollers will bear against the other rail when the thrust upon said rollers tends to move the block in the opposite direction. As will be hereinafter more fully described the thrust upon the rollers by the cam tracks is occasioned by the curvature of the tracks.

Opposite guide-supporting members 71 are mounted upon each wall 62, said guide-supporting members carrying guides 72 which function to guide blocks 67 for reciprocating movement toward and away from the space 55 as the rollers pass over curved portions of the cam tracks. A coil spring 73 embraces each shank 66 and bears, at one end, upon guide block 67, and at the other end upon heel 74 of the projecting member 60. Thus, projecting members 60 are resiliently mounted upon blocks 67 with respect to motion into and out of space 55.

It is to be understood that a plurality of assemblies, as hereinbefore described, comprising projecting members 60, blocks 67, rollers 69 and 70 etc. are employed at each side of the device and all such assemblies are identical, being the same as that hereinbefore described. Of course two sets of cam tracks are employed, one on each side of the rotatable frame, each set of cam tracks comprising a pair of cam rails 63 and a pair of offset cam rails 64. In this fashion, the projecting members 60 at each side of the arcuate space 55 are manipulated.

Figure 6:
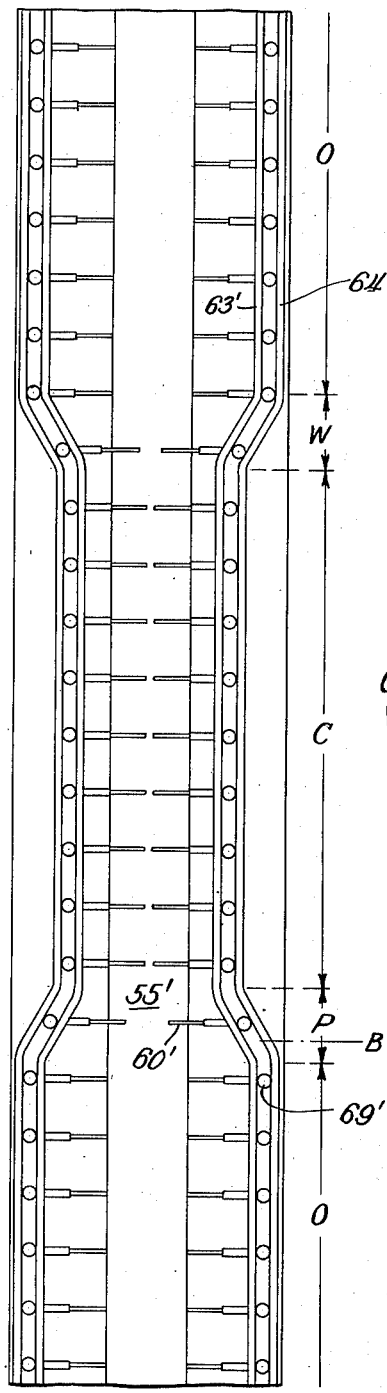
Fig. 6 is a diagrammatic development of the cam rails or tracks for actuating the blades or projecting members employed with the device.
Figure 7:
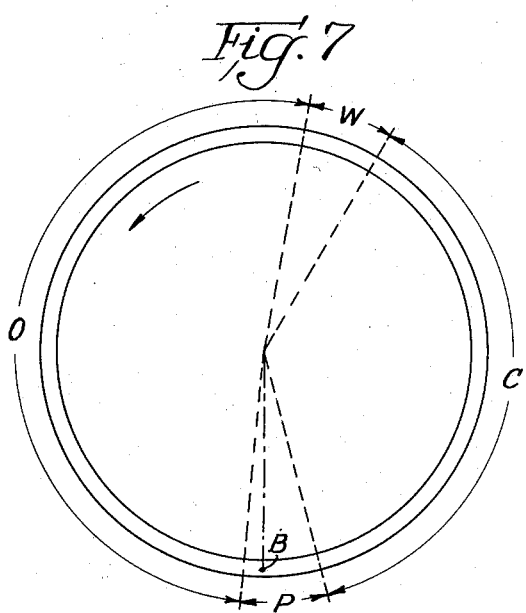
Fig. 7 is a diagrammatic view which relates the development of the cam rails or tracks to a cycle of rotation of the rotating frame portion of the device.

As has been hereinbefore described, the cam track on each side of the rotating frame 2, but mounted on the stationary frame 1, follow generally the path of travel of the periphery of the rotating frame. In Figs. 6 and 7 diagrammatic views of the cam tracks are shown which illustrate the phase relationship of the movement of the projecting members to the angular position of the rotatable frame. Primed reference numerals will be employed in Fig. 6 to designate corresponding parts hereinbefore described.

In Figs. 6 and 7, B indicates the point of tangency of the upper pass of the feed conveyor 44 with the rotating frame. As shown, the point B is located on the assumption that the upper pass of the conveyor 44 moves horizontally toward the elevating device. If the upper pass of the conveyor 44 is inclined in its approach to the device the point B, of course, will be angularly displaced in one direction or the other pending upon the angle of inclination of the conveyor belt 2 of the rotating frame. P indicates where the cam tracks are curved, that is, the cam tracks move from an outward position to an inner position whereby the projecting members 60' move inwardly toward space 55'. It will be noted that as the rotating frame moves in a counter-clockwise direction the rollers 69 and 70, referred to as rollers 69', encounter curved portions of the cam tracks and said rollers tend to move inwardly before the point B is reached. In other words, the projecting members or blades 60' are moving inwardly toward the arcuate space 55' when the point B is reached. Said rollers continue to move inwardly and the projecting members or blades move inwardly toward space 55' for an arcuate distance of travel beyond the point B. The projecting members or blades at this position are penetrating the mass of material 47 carried upon the belt 44.

C indicates the major portion of upward travel of the rotating frame and it will be noted from Figs. 6 and 7 that the projecting members or blades 60' are in their innermost position during the duration of travel through the distance C. In other words, the projecting members or blades are in their innermost position with respect to the space 55' and consequently that function has baffles or partitions to prevent the rearward sliding or retrogressive movement of the material 47 as it is carried upwardly through the arcuate space between belts 44 and 45.

As the movement of the rotating frame progresses the rollers 69' again encounter curved or offset portions of the cam tracks wherein feed rollers are moved outwardly thereby moving the projecting members or blades 60' outwardly from space 55'. This phase of movement is designated by W and occurs generally in the neighborhood of the terminal roll 46 for the belt 44. With the inclination of the discharge belt 45 as shown, it will be noted that said belt tends to leave the surface of the cylindrical drum plate 24 slightly before the uppermost position of travel is reached by said drum plate. Of course, it is to be understood that the working or upper pass of the discharge conveyor 45 may leave at the angle shown or may leave at any desired inclination in which case the position at which the offset W occurs may be somewhat changed. The critical aspect of the position of the offset W is that it will be so positioned that the projecting members 60' will be completely retracted before the belt 45 begins to leave the drum plate 24. In this fashion the projecting members or blades will not interfere with the movement of the discharge conveyor 45 as it leaves the drum plate.

After the projecting members or blades 60' have moved outwardly from the space 55' they remain in retracted position throughout the distance indicated by O and after traversing this distance the blades are again moved inwardly at the commencement of the period designated by P.

With reference to Fig. 7 it is to be understood that the angles spanned by P and W may be enlarged or diminished by the abruptness of the cam track curves in moving inwardly and outwardly. That is, the blades for projecting members 60' may be inserted rapidly or more slowly into the mass of material 47 and likewise said blades or projecting members may be withdrawn more rapidly or more slowly depending upon the angular span of P and W. It is also to be understood that the position of the angle spanned by P and by W may be changed relative to each other. This change will be predicated primarily upon the angles of inclination of the feed conveyor 44 and the discharge conveyor 45 relative to the periphery of the rotating frame 2.

The projecting members 60 are spring mounted upon blocks 67 so that if said projecting members during their inward movement toward the space 55 encounter lumps such as indicated by the lump 75 said blades and their mountings will not be broken. The blades will continue to move inwardly toward space 55 until an obstruction is met which offers sufficient force to compress the springs 73 at which time blocks 67 may move inwardly under the influence of the inwardly curving cam track but the projecting members or blades will remain stationary, that is, they will be held in abutting relationship with respect to the obstructing lump 75.

In conveying discrete material such as sand or the like the projecting member 60 may take the form of relatively flat blades as illustrated whereby the flat surfaces of the blades will be most effective in preventing retrogressive movement of the material conveyed. If, on the other hand the material 47 is extremely lumpy and coarse, the projecting members may take the form of bars which, if desired, may be pointed at their ends to facilitate penetration into the mass of the material. It is to be understood, of course, that any desired form of projecting member is contemplated which will be suitable for the type of material conveyed.

In order to prevent the material conveyed from entering the compartments 56 whereby such material might interfere with the operation of the shanks 66 in the blocks 67, opposite blade members 76 may bear upon the opposite faces of the projecting members 60. The blade members 76 may be secured to shanks 77 around which coil springs 78 may be positioned. The shank 77 may be slidably positioned in lugs 79 and the coil spring 78 may bear at their ends upon lugs 79 and also upon heels 80 of the members 76. In this fashion the members 76 are urged toward the opposite surface of the projecting members 60 and tend to effect a seal through which the projecting members 60 extend.

It can readily be seen that herein is provided a device which may be employed in elevating material from a lower elevation to a higher elevation and wherein the material is conveniently and efficiently transferred from one conveyor to another conveyor. The elevation of the material takes place more or less abruptly, that is, for a predetermined distance of travel of the material, the effective height to which the material is elevated is relatively great. Of importance, in securing a great effective lift of the material the projecting members or blades are employed to prevent rearward slipping or retrogressive movement of the material during the elevating period.

I claim as my invention:

1. An elevator-conveyor comprising a relatively stationary frame, a relatively movable frame mounted for rotation in a substantially vertical plane upon said stationary frame, means upon said stationary frame for rotating said rotatable frame, inner wall means carried upon said rotatable frame adjacent the periphery of the upwardly moving side of said rotatable frame and movable with said rotatable frame, outer wall means carried upon a portion of said rotatable frame in radially spaced relationship to said inner wall means whereby an arcuate space is provided for material to be elevated and conveyed, said outer wall means being movable with said rotatable frame, projecting means carried by said rotatable frame movable laterally into said arcuate space to inhibit retrogressive movement of the material therein, and cam track means carried by one of said frames and cam follower means carried by the other frame and engageable with said cam track means for moving said projecting means into said arcuate space.

2. An elevator-conveyor comprising a relatively stationary frame, a relatively movable frame mounted for rotation in a substantially vertical plane upon said stationary frame, means upon said stationary frame for rotating said rotatable frame, inner wall means carried upon said rotatable frame adjacent the periphery of the upwardly moving side of said rotatable frame and movable with said rotatable frame, outer wall means carried upon a portion of said rotatable frame in radially spaced relationship to said inner wall means whereby an arcuate space is provided for material to be elevated and conveyed, said outer wall means being movable with said rotatable frame, projecting means carried by said rotatable frame on opposite sides of said rotatable frame and movable laterally into said arcuate space from opposite sides of said space to inhibit retrogressive movement of the material therein, and mechanical urging means carried by said stationary frame for contacting and urging said projecting means into said arcuate space.

3. An elevator-conveyor comprising a relatively stationary frame, a relatively movable frame mounted for rotation in a substantially vertical plane upon said stationary frame, means upon said stationary frame for rotating said rotatable frame, inner wall means carried upon said rotatable frame adjacent the periphery of the upwardly moving side of said rotatable frame and movable with said rotatable frame, outer wall means carried upon a portion of said rotatable frame in radially spaced relationship to said inner wall means to define an arcuate space between said wall means for material to be elevated and conveyed, said outer wall means being movable with said rotatable frame, projecting means carried by said rotatable frame movable laterally into said arcuate space to inhibit retrogressive movement of the material therein, cam follower means carried by said projecting means, and a cam track carried by said stationary frame with which said cam follower means engages for moving said projecting means into said arcuate space.

4. An elevator-conveyor comprising a relatively stationary frame, a relatively movable frame mounted for rotation in a substantially vertical plane upon said stationary frame, means upon said stationary frame for rotating said rotatable frame, relatively flexible inner wall means wrapped upon said rotatable frame adjacent the periphery of the upwardly moving side of said rotatable frame and movable with said rotatable frame, relatively flexible outer wall means wrapped upon said rotatable frame in radially spaced relationship to said inner wall means to define an arcuate space between said wall means for material to be elevated and conveyed, said outer wall means being movable with said rotatable frame, projecting means carried by said rotatable frame movable laterally into said arcuate space to inhibit retrogressive movement of the material therein, cam follower means carried by said projecting means, and a cam track carried by said stationary frame with which said cam follower means engages for moving said projecting means into said arcuate space.

5. An elevator-conveyor comprising a relatively stationary frame, a relatively movable frame mounted for rotation in a substantially vertical plane upon said stationary frame, means upon said stationary frame for rotating said rotatable frame, inner wall means carried upon said rotatable frame adjacent the periphery of the upwardly moving side of said rotatable frame and movable with said rotatable frame, outer wall means carried upon a portion of said rotatable frame in radially spaced relationship to said inner wall means whereby an arcuate space is provided for material to be elevated and conveyed, said outer wall means being movable with said rotatable frame, relatively flat blades carried by said rotatable frame movable laterally into said arcuate space with the flat faces thereof disposed transverse to their arcuate travel with said rotatable frame to inhibit retrogressive movement of the material in said space, cam follower means carried by said blades, and a cam track carried by said stationary frame with which said cam follower means engages for moving said blades into said arcuate space.

6. An elevator-conveyor comprising a relatively stationary frame, a relatively movable frame mounted for rotation in a substantially vertical plane upon said stationary frame, means upon said stationary frame for rotating said rotatable frame, inner wall means carried upon said rotatable frame adjacent the periphery of the upwardly moving side of said rotatable frame and movable with said rotatable frame, outer wall means carried upon a portion of said rotatable frame in radially spaced relationship to said inner wall means whereby an arcuate space is provided for material to be elevated and conveyed, said outer wall means being movable with said rotatable frame, a cam track mounted upon said stationary frame adjacent said rotatable frame, blocks movable in said cam track, projecting means carried by said rotatable frame, said projecting means being connected to said blocks whereby movement of said blocks in said cam track moves said projecting means laterally into said arcuate space to inhibit sliding movement of said material in said space.

7. An elevator-conveyor comprising a relatively stationary frame, a relatively movable frame mounted for rotation in a substantially vertical plane upon said stationary frame, means for rotating said rotatable frame upon said stationary frame, a discharge belt wrapped upon the upwardly moving side of said rotatable frame, a feed belt mounted for movement around substantially the same portion of the rotatable frame in radial spaced relationship to said discharge belt whereby an arcuate space is provided between said belts through which material to be elevated and conveyed is carried by said belts, projecting members carried by said rotatable frame for lateral movement into said arcuate space to inhibit retrogressive movement of the material therein, and cooperative cam follower and cam track means carried by said stationary frame and said projecting members for moving said projecting members laterally into said arcuate space.

8. An elevator-conveyor comprising a relatively stationary frame, a relatively movable frame mounted for rotation in a substantially vertical plane upon said stationary frame, means for rotating said rotatable frame upon said stationary frame, an endless discharge belt wrapped around a portion of said rotatable frame including its upwardly moving side and movable with said rotatable frame, an endless feed belt having a portion spaced radially from said discharge belt at the upwardly moving side of the rotatable frame whereby an arcuate space is provided between said belts in which material to be elevated and conveyed is carried by said belts, projecting means carried by said rotatable frame on each side thereof and movable laterally into said arcuate space to inhibit retrogressive movement of the material in said space, said projecting means on each side of said rotatable frame being circumferentially spaced, and cooperative cam follower and cam track means carried by said stationary frame and said projecting means for moving said projecting means laterally into said arcuate space.

9. An elevator-conveyor comprising a relatively stationary frame, a relatively movable frame mounted for rotation in a substantially vertical plane upon said stationary frame, means upon said stationary frame for rotating said rotatable frame, inner wall means carried upon said rotatable frame adjacent the periphery of the upwardly moving side of said rotatable frame and movable with said rotatable frame, outer wall means carreid upon a portion of said rotatable frame in radially spaced relationship to said inner wall means whereby an arcuate space is provided for material to be elevated and conveyed, said outer wall means being movable with said rotatable frame, a cam track mounted upon said stationary frame adjacent said rotatable frame, blocks movable in said cam track, projecting means carried by said rotatable frame, resilient means connecting said projecting means and said blocks whereby movement of said blocks in said cam track moves said projecting means laterally into said arcuate space to inhibit sliding movement of said material in said space.

10. An elevator-conveyor comprising a relatively stationary frame, a relatively movable frame mounted for rotation in a substantially vertical plane upon said stationary frame, means upon said stationary frame for rotating said rotatable frame, inner wall means carried upon said rotatable frame adjacent the periphery of the upwardly moving side of said rotatable frame and movable with said rotatable frame, outer wall means carried upon a portion of said rotatable frame in radially spaced relationship to said inner wall means whereby an arcuate space is provided for material to be elevated and conveyed, said outer wall means being movable with said rotatable frame, an endless cam track mounted upon said stationary frame adjacent said rotatable frame, blocks movable in said cam track, projecting means carried by said rotatable frame, said projecting means being connected to said blocks, spaced portions of said cam track being offset different distances from said rotatable frame whereby movement of said blocks with said projecting means in said cam track moves the projecting means laterally into and out of said arcuate space.

11. An elevator-conveyor comprising a relatively stationary frame, a relatively movable frame mounted for rotation in a substantially vertical plane upon said stationary frame, means upon said stationary frame for rotating said rotatable frame, inner wall means carried upon said rotatable frame adjacent the periphery of the upwardly moving side of said rotatable frame and movable with said rotatable frame, outer wall means carried upon a portion of said rotatable frame in radially spaced relationship to said inner wall means whereby an arcuate space is provided for material to be elevated and conveyed, said outer wall means being movable with said rotatable frame, an endless cam track mounted upon said stationary frame adjacent said rotatable frame, blocks movable in said cam track, projecting means carried by said rotatable frame, said projecting means being connected to said blocks, said cam track having a portion offset inwardly adjacent the lower portion of said arcuate space whereby movement of said blocks with said projecting means in said cam track moves the projecting means laterally into said arcuate space to inhibit retrogressive movement of the material in said space during upward travel of said material.

References Cited in the file of this patent
UNITED STATES PATENTS 2,595,177      Stevens _____ Apr. 29, 1952